United States Patent [19]
Eickhoff et al.

[11] Patent Number: 5,673,991
[45] Date of Patent: Oct. 7, 1997

[54] ADJUSTING SYSTEM FOR A REFLECTOR OF A MOTOR VEHICLE HEADLIGHT

[75] Inventors: Willi Eickhoff, Warstein; Gerhard Stumpe, Lippstadt, both of Germany

[73] Assignee: Hella KG Hueck & Co., Lippstadt, Germany

[21] Appl. No.: 489,711

[22] Filed: Jun. 13, 1995

[30] Foreign Application Priority Data

Jun. 15, 1994 [DE] Germany .............. 44 20 779.4

[51] Int. Cl.$^6$ ...................................... B60Q 1/04
[52] U.S. Cl. ................ 362/66; 362/272; 362/286; 362/428
[58] Field of Search ............... 362/66, 272, 286, 362/428, 273, 282, 284, 287, 289, 425, 61

[56] References Cited

U.S. PATENT DOCUMENTS

| | | | |
|---|---|---|---|
| 4,524,407 | 6/1985 | Igura | 362/66 |
| 4,916,587 | 4/1990 | Hirose et al. | 362/66 |
| 5,251,114 | 10/1993 | Cantin et al. | 362/272 |
| 5,321,589 | 6/1994 | Shinkawa et al. | 362/66 |

FOREIGN PATENT DOCUMENTS

| | | |
|---|---|---|
| 0 384 838 | 8/1990 | European Pat. Off. . |
| 39 15 300 | 11/1989 | Germany . |
| 39 15 300 A1 | 11/1989 | Germany . |
| 42 04 097 | 8/1992 | Germany . |
| 42 04 097 A1 | 8/1992 | Germany . |
| 2 283 556 | 5/1995 | United Kingdom . |

*Primary Examiner*—Ira S. Lazarus
*Assistant Examiner*—Alfred Basichas
*Attorney, Agent, or Firm*—Griffin, Butler, Whisenhunt & Kurtossy

[57] ABSTRACT

A manual and an electromotive actuatable adjusting apparatus for a reflector of a motor-vehicle headlight (1) are arranged together in a common housing. An adjusting pin (4), which is attachable to the reflector, can be moved along its length axis by both the manual and the electromotor adjusting apparatus. An end portion (6) of the adjusting pin, directed away from the reflector, slidably engages in a blind hole (7) of a gear (9) to be rotatable therewith. The gear is sealingly seated in a hollow cylinder (10) of a cover (2) and its hub (8) rotatably engages, while being axially fixed, in a bearing opening (13) in an end wall (12) closing off the hollow cylinder to the outside. There are a plurality of openings (14) in the hollow cylinder which allow a rod-shaped auxiliary tool (11) to be inserted therethrough so that when the tool is rotated about its length axis tooth-like protrusions (15) thereof engage in teeth (16) of the gear. The cover, with the hollow cylinder, is sealingly mounted on a base part (3) of the housing, the housing being formed of the cover and the base part and including an attaching element for attaching the housing to the headlight.

10 Claims, 2 Drawing Sheets

5,673,991

ADJUSTING SYSTEM FOR A REFLECTOR OF A MOTOR VEHICLE HEADLIGHT

BACKGROUND OF THE INVENTION

This invention relates to an adjusting system for a reflector of a motor vehicle headlight having a manual and an electromotor (electromechanical) actuatable adjusting apparatus, with the system including a housing for containing the electromotor adjusting apparatus and with an end portion of an adjusting pin, which can be manually and electromechanically moved along its length axis, extending out of the housing and being attachable to the reflector, an opposite end portion of the adjusting pin slidably extending into a blind, or dead-end, hole of a hub of a gear and keyed to the gear against relative rotation therewith, the gear being sealingly mounted in a hollow cylinder about its periphery and being manually rotatable by means of a rod-shaped auxiliary tool.

Such an adjusting system for a reflector of a motor vehicle headlight having a manual and electromotor actuatable adjusting apparatus is disclosed in german patent publication 42 04 097 A1. A pot-shaped headlight housing constructed of resinous plastic is closed off by a bowl-shaped light-transmissive shield. A bowl-shaped reflector is mounted in an interior formed by the headlight housing and the light-transmissive shield to pivot about horizontal and vertical axes. The reflector can be rotated about the horizontal axis by manual and electromotor adjusting apparatus. Each of the manual adjusting apparatus and the electromotor adjusting apparatus is contained in its own two-part housing. The two-part housing of the electromotor adjusting apparatus is mounted in the interior of the pot-shaped headlight housing. Both end portions of an adjusting pin extend out of the two-part housing of the electromotor adjusting apparatus. One of the two end portions has an articulating linkage with the reflector while the other end portion extends toward a rear wall of the headlight housing. A collar, which is formed on the two-part housing of the electromotor adjusting apparatus, extends about the last-mentioned end portion of the adjusting pin, but is spaced therefrom. The two-part housing of the manual adjusting apparatus is formed of a hollow cylinder which is formed as one piece with the headlight housing and a cap which covers the hollow cylinder on the outside end thereof. The collar of the two-part housing of the electromotor adjusting apparatus engages in the hollow cylinder with very little play. Only a close tolerance between the collar and the hollow cylinder ensures an easy and jerk-free adjustment of both adjusting apparatus. A surrounding shoulder is formed in the interior of the hollow cylinder against which a gear, inserted into the hollow cylinder from a rear side of the headlight housing is supported, with an intermediate ring seal. The gear is a crown gear constructed of sheet metal with its teeth extending toward the rear of the headlight. The crown gear and its hub are formed as two pieces. The hub, which is fixed to the rest of the crown gear, is constructed of resinous plastic and extends away from the rest of the crown gear toward the reflector so that a blind hole thereof is facing the reflector. One of the end portions of the adjusting pin engages slidably in this blind hole, with the blind hole and the adjusting pin having flat perimeter portions to key the adjusting pin and the hub of the gear against relative rotation. A shaft, which extends radially to the length axis of the adjusting pin, is in the cap on the hollow cylinder supporting a spur gear, whose teeth mesh with the teeth of the larger (crown) gear, in the interior of the cap. An end portion of the shaft extending outwardly from the cap has a rotation device thereon with which a rod-shaped auxiliary tool can be brought into rotationally-fixed engagement with the shaft. The rod-shaped auxiliary tool can be a Phillips head screwdriver. Because each of the manual and the electromotor adjusting apparatus has its own two-part housing and the manual adjusting apparatus is constructed of many individual parts, the manufacture of this device is cost intensive and its mounting is difficult and time consuming. Further, the manual adjusting apparatus can be rotated only from one direction by the rod-shaped auxiliary tool. When the rod-shaped auxiliary tool is rotated about its length axis the spur gear engages the teeth of the crown gear so that, the adjusting pin, which rotates with the crown gear, rotates about its length axis and makes an adjustment along its length axis because it engages in a nut on the reflector. When the electromotor adjusting apparatus is activated an electrical motor mounted in its two-part housing moves the adjusting pin along its length axis via an intermediate linkage. When this is done, the end portion of the adjusting pin moves in the blind hole of the hub of the crown gear. If the length axis of the hub and the length axis of the adjusting pin are not accurately arranged, a great adjusting force must be applied for both adjusting apparatus. This is particularly disadvantageous for the electromotor adjusting apparatus because its adjusting force is usually quite small and thus if a small radial force is present, no automatic adjustment by means of the electromotor adjusting apparatus is possible.

It is an object of this invention to provide an adjusting system for a reflector of a motor vehicle headlight, of the type described in the opening paragraph above, that allows both adjusting apparatus to be easily and subsequently mounted on a motor vehicle headlight, and which is constructed of very few additional parts. Further, it is an object of this invention to provide such an adjusting system with which a manual adjusting apparatus can be adjusted from a plurality of directions by means of a rod-shaped auxiliary tool, and further, which protects an interior of a headlight housing as well as the electromotor adjusting apparatus from dirt and sprayed water.

SUMMARY OF THE INVENTION

According to principles of this invention, an adjusting system for a reflector of a motor vehicle headlight has a gear receiving hollow cylinder which is constructed as one piece with a cover of a housing so as to extend outwardly from the cover to have an end wall at an end portion extending away from the rest of the cover, the floor defining a centrally-positioned bearing opening in which a hub of the gear is held to be rotatable, but axially fixed. The hollow cylinder is provided with a plurality of openings which allow a rod-shaped auxiliary tool to be inserted therethrough so that, as the rod-shaped auxiliary tool is rotated about its length axis, tooth-like protrusions thereof mesh with teeth of the gear. The cover, which is formed as one piece with the hollow cylinder, sealingly covers a base part of the housing, with the cover and the base part including an attaching element for attaching one of these to the headlight.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodi

DESCRIPTION OF THE PREFERRED EMBODIMENT

Figure 1:
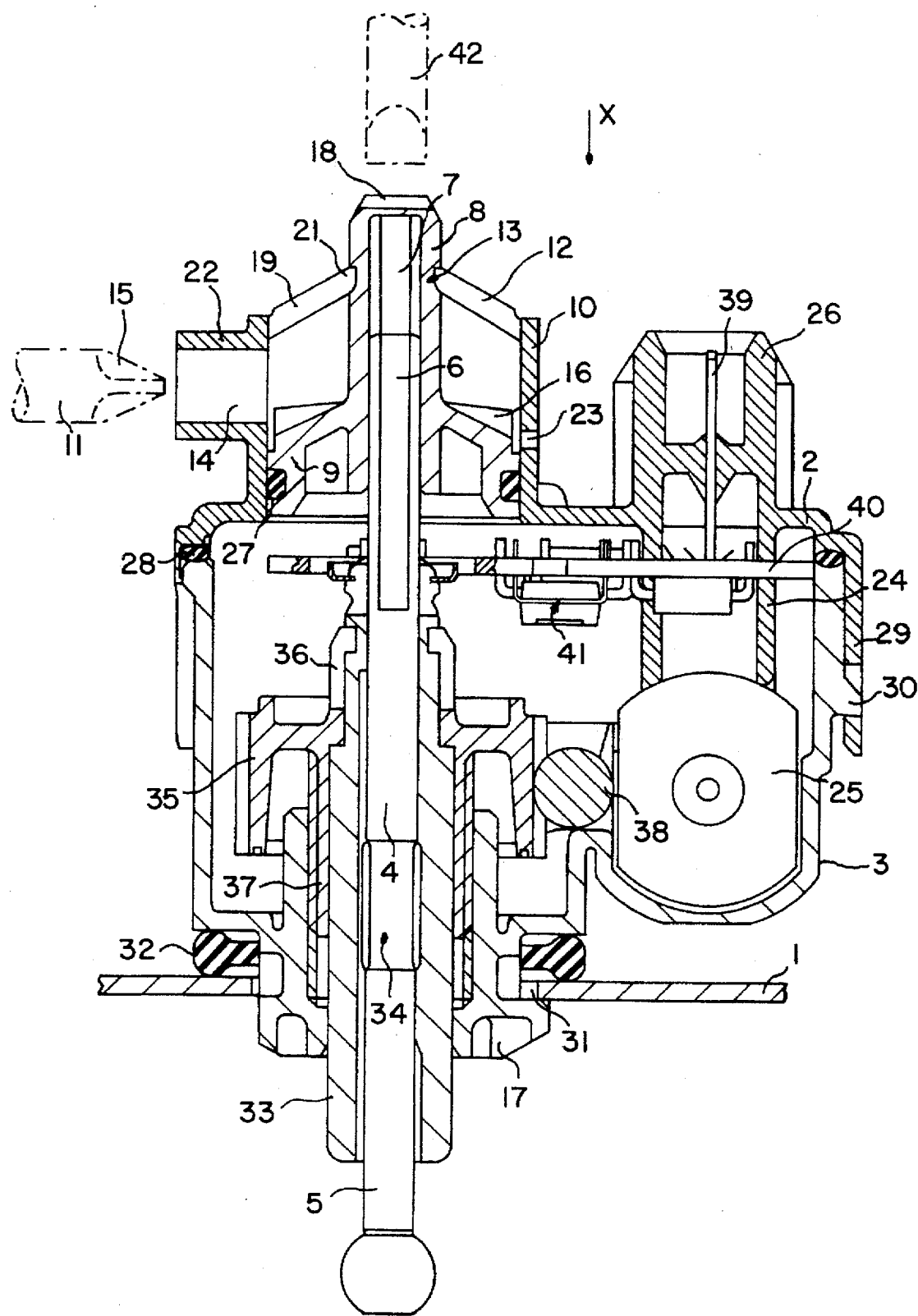
- FIG. 1 is a lengthwise center cross section taken through a manual and electrical adjusting apparatus of this invention for a motor vehicle headlight.
Figure 2:
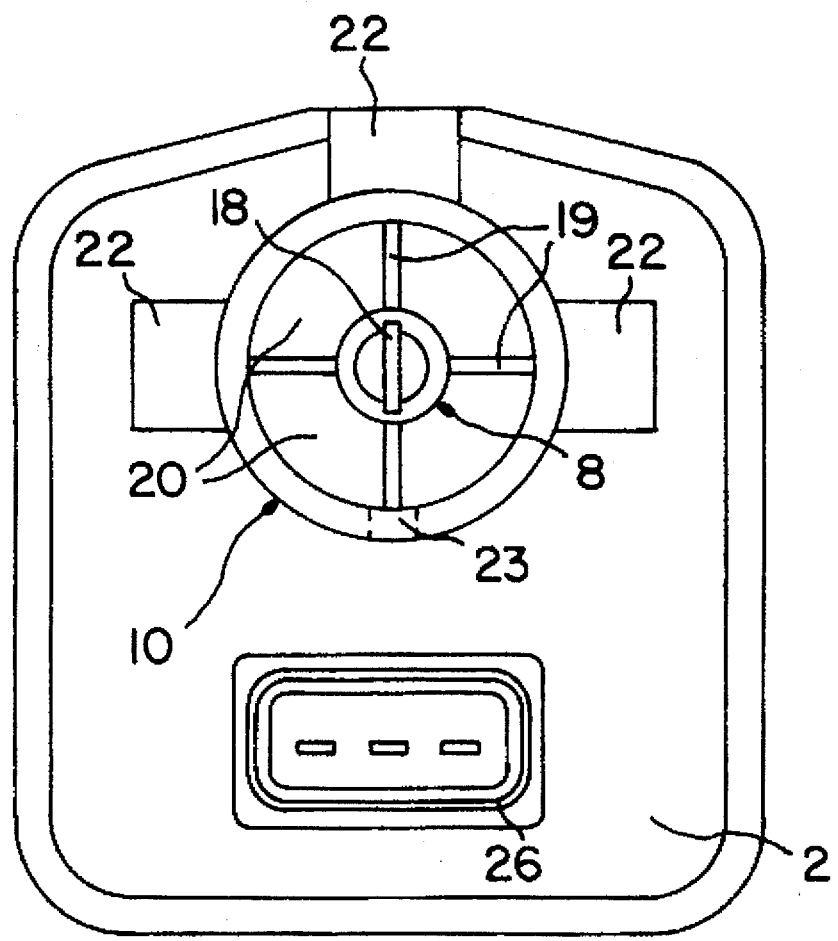
FIG. 2 is a top plan view taken from the direction X in FIG. 1.

A housing, constructed of resinous plastic and comprising a pot-shaped base part 3 and a cover 2, serves to receive a manual and an electrical adjusting apparatus for a reflector (not shown) of a motor vehicle headlight 1. The electrical adjusting apparatus is mounted in the pot-shaped base part 3 while a gear 9 of the manual adjusting apparatus is mounted in the cover 2. The reflector can be remotely pivoted about a horizontal axis by the electromotor adjusting apparatus, while the manual adjusting apparatus can be manipulated on the headlight 1 by a rod-like auxiliary tool 11 and 42. The reflector is also rotatable about the horizontal axis by means of the manual adjusting apparatus. An outer surrounding edge of the cover 2 sealingly seats on an outer surrounding edge of the pot-shaped base part 3, with an intervening seal 28 being therebetween, and has lugs 29 which lie on an outer surface of the pot-shaped base part 3. The lugs 29 self-guidingly engage behind noses 30 formed on the outer surface of the base part 3. The base part 3 has at its underside an attaching element 17 which engages in a housing opening 31 of the motor vehicle headlight 1 and is keyed against rotation with the motor vehicle headlight 1 by the attaching element 17. The housing opening 31 is surrounded at its exterior side by a ring-shaped rubber seal 32 which sealingly seats against the base part 3. An adjusting pin 4 extends through the center of the housing opening 31, with its outwardly-extending end portion 5 directed toward the reflector, its free, or tip, outer end having an articulated ball and socket coupling with the reflector. The adjusting pin 4 extends through a tubularly-shaped nut part (female-threaded part) 33 and has a male threaded portion 34 which can be screwed thereinto. The nut part 33 is movably driven in an opening of the base part 3 in the direction of the length axis of the adjusting pin 4, however, it is rotationally fixed with the base part 3 at the opening 31. A worm gear wheel 35 is shoved onto the tubularly-shaped nut part 33 so that spring arms 36 thereof self-lockingly engage in a ring groove of the nut part 33 to be rotatable relative to the tubularly-shaped nut part 33 but to be fixed thereto lengthwise of the adjusting pin 4. A collar-shaped hub 37 of the worm gear wheel 35 is shoved onto the tubularly-shaped nut part 33. The collar-shaped hub 37 has on its outer surface a male thread which is screwed into a female thread in a floor of the pot-shaped base part 3. Thus, the adjusting pin 4 is axially fixed to the base part 3 by the tubularly-shaped nut part 33 and the worm gear wheel 35 and is adjustable along its length axis by rotation of the worm gear wheel 35. Rotation of the worm gear wheel 35 is caused by an electrical motor 25 which, via a linkage (not shown), cooperates with a worm gear thread 38 which engages with the worm gear wheel 35. The electric motor 25 is mounted in a depression of the floor of the pot-shaped base part 3 and is held in position by shoulders 24 formed on the inside of the cover 2. The shoulders 24 extend, or change into, a wall of a plug housing 26 formed on an exterior surface of the cover 2. The two shoulders 24 and the wall of the plug housing 26 serve, therefore, as stiffening ribs for the cover 2. Plug terminals 39 are arranged in the plug housing 26 so as to make electrical contact with a circuit board 40 mounted in the pot-shaped base part 3. The electrical circuit board 40 is provided with electrical components 41. The circuit board 40 covers, when the cover 2 is removed, the interior of the pot-shaped base part 3 as much as possible.

A hollow cylinder 10 is formed on an outer surface of the cover 2 near the plug housing 26 to be open to the inside of the cover 2 and to be closed at its other end to the outside by an end wall, or floor, 12. The end wall 12 has a centrally-positioned bearing opening 13 from which radially outwardly directed slits 19 extend in the end wall 12. The end wall 12 is divided by the slits 19 into four equal-size end wall portions 20, which have axial spring action. The toothed gear 9, which has a perimeter ring groove about its perimeter surface in which a ring seal 27 is placed, is mounted in the hollow cylinder 10 from the inside of the cover 2. The surrounding ring seal 27 is sealed against the interior surface of the hollow cylinder 10. Teeth 16 of the gear 9 are at a base of the toothed gear 9 directed toward the end wall 12 of the hollow cylinder 10. The gear 9 is constructed of one piece of resinous plastic with its hub 8. The hub 8 extends outwardly from the toothed gear 9 through the bearing opening 13 of the end wall 12. The edges of the end wall portions 20 of the hollow cylinder 10 adjacent the bearing opening 13 engage in a ring groove 21 of the hub 8. A blind hole 7 is in the hub 8, as seen from the inside of the cover 2. An end portion of the hub 8 which extends outwardly from the bearing opening 13 of the end wall 12 has at its end surface a rotation device 18. The rotation device 18 defines a slit extending radial to the length axis of the adjusting pin 4 at an end surface of the hub 8. By use of a rod-shaped auxiliary tool 42, which has a wedge-shape tip, the toothed gear can be rotated about its length axis. When this is done the length axis of the rod-shaped auxiliary tool 42 and that of the adjusting pin 4 coincide. Three openings 14 are placed in the hollow cylinder 10 between the end wall 12 and the gear 9 which are surrounded by guiding shells, or jackets, 22 formed on the outer surface of the hollow cylinder. The length axes of the guiding jackets 22 extend radially to the length axis of the adjusting pin 4 and lie respectively at right angles to one another. A water drain opening 23 is in the wall of the hollow cylinder 10 adjacent the plug housing 26. It is thereby assured that in every structural situation no water can accumulate in the space between the end wall 12 and the gear 9. A rod-shaped auxiliary tool 11 can be inserted through the guiding jackets 22 until its tip engages the perimeter surface of the hub 8. In this position, tooth-like protrusions 15 at the tip portion of the rod-like auxiliary tool 11 mesh with teeth 16 of the gear 9. The rod-like auxiliary tool 11 can be a Phillips-head screwdriver. When the rod-like auxiliary tool 11 is rotated, its tooth-like protrusions 15 mesh with the teeth 16 of the toothed gear 9. When the gear 9 is rotated about its length axis, the adjusting pin 4 is also rotated because its end portion 6, which is in the blind hole 7 of the hub 8, is rotationally locked with the gear, although it is axially movable in the blind hole 7. The gear 9 and the adjusting pin 4 are rotationally fixed to one another because the end portion 6 of the adjusting pin 4 and the blind hole 7 have interengaging flat areas. When the adjusting pin 4 is rotated, it moves in the direction of its length axis because its threaded portion 34 engages in the female threads of the tubularly-shaped nut part 33. Thus, the reflector can be pivoted about the horizontal axis of the motor vehicle headlight 1 by either the manual adjusting apparatus or the electromotor adjusting apparatus. Thus, the manual and the electromotor adjusting apparatus together have one two piece housing and the electromotor adjusting apparatus is protected against dirt and spray water contamination, although additional individual parts are not necessary for the manual adjusting mechanism other than the toothed gear which is sealingly mounted in the hollow cylinder. Further, an easy and jerk-free adjustment of the adjusting pin is always assured because both of the adjusting mechanisms are mounted in a common housing. Further, the two piece housing can be easily and simply attached to the exterior of a headlight. Attachment of the two piece housing to the headlight can be accomplished by a screw-lock interengagement between both parts.

Further, it is beneficial that the free end portion of the hub of the toothed gear, which extends out of the bearing opening, has a rotation device thereat. With this arrangement the manual adjusting apparatus can also be manipulated at this point by means of a rod-shaped auxiliary tool and the electromotor adjusting apparatus is nevertheless still protectively arranged in the two part housing.

It is further beneficial that openings for the rod-like auxiliary tool are arranged radially to the length axis of the adjusting pin. This is useful because adjustment of the headlight should preferably be accomplished from above.

It is also beneficial that a plurality of radially outwardly extending slits, from the central bearing opening, are made in the end wall of the hollow cylinder which divide the end wall into axial spring portions, with their edges adjacent the centrally-positioned bearing opening being self-lockingly engaged in the ring groove of the hub. With such an arrangement the toothed gear can be easily and simply mounted and, nevertheless, the gear is securely held. In this regard, it is further beneficial that the end wall of the hollow cylinder has a conical shape, with a length axis of the cone coinciding with a length axis of the adjusting pin and the cone extending outwardly from the hollow cylinder. Such a conical shape can withstand a great pressing force in the direction of the reflector without the cover being deformed. Such a pressing force appears when the rod-shaped auxiliary tool is pressed against the rotation device at the free end, or tip end, portion of the hub.

It is additionally beneficial that the openings in the hollow cylinder are surrounded by guiding jackets formed on the outer surface of the hollow cylinder. These guiding jackets make it easy to rotate the rod-shaped auxiliary tool since the rod-shaped auxiliary tool does not have protrusions which serve to engage the teeth of the gear at the area of the guiding jackets. Further, it is beneficial that the perimeter surface of the hub of the gear, between the end wall of the hollow cylinder and the gear, serves as a stop surface for the tip of the rod-shaped auxiliary tool. Because of this, even when a great radial pressing force is applied to the rod-shaped auxiliary tool, no damage is caused to the manual adjusting apparatus.

Still further, it is beneficial that the hub and the gear are manufactured of one piece of plastic material and that a surrounding groove is in a perimeter surface thereof in which a ring seal is mounted for sealingly seating against the interior surface of the hollow cylinder. Such an arrangement is uncomplicated and quite cost effective to manufacture.

Further, it is beneficial that the hollow cylinder has a water drain opening between the openings for the rod-shaped auxiliary tool. A water drain opening is useful when there is no additional opening for the rod-shaped auxiliary tool on a side diametrically opposite to a side having an opening for the rod-shaped auxiliary tool.

In a particularly beneficial further embodiment of the invention, at least one shoulder is formed on the inner side of the cover extending into the housing which merges into a wall of an outwardly extending plug housing of the cover, with the shoulder holding an electrical motor of the electrical adjusting apparatus firmly against an opposite floor surface of the base part. In this manner the cover is quite distortion stiff and even upon a great pressure of the cover against the electrical motor the function of both adjusting apparatus is assured.

The invention claimed is:

1. Adjusting system for a reflector of a motor vehicle headlight having both a manual adjusting apparatus and an electromotor adjusting apparatus, with the system including: a housing for containing the electromotor adjusting apparatus; an adjusting pin (4) which can be moved along its length axis, with an end portion (5) of the adjusting pin extending out of the housing and being attachable to a reflector; and a gear (9) having a hub 8, with an opposite end portion (6) of the adjusting pin slidably extending into a blind hole (7) of the hub (8) of the gear (9), but being keyed to the gear against relative rotation therewith, the gear being sealingly mounted about its periphery in a hollow cylinder (10) of the housing and including a rotation means for being manually rotated by a rod-shaped auxiliary tool, wherein:

the hollow cylinder (10) for receiving the gear (9):

is constructed as one piece with a cover (2) of the housing;

extends outwardly from the cover;

has an end wall (12) at an end portion extending away from the cover (2) defining a centrally-positioned bearing opening (13) in which the hub (8) of the gear (9) is held to be rotational but axially fixed; and is provided with a plurality of openings (14) for receiving the rod-shaped auxiliary tool, said rotation means comprising teeth which can mesh with tooth-like protrusions of the rod-shaped auxiliary tool when it is extended through said openings; and wherein the cover (2), which is formed as one piece with the hollow cylinder (10), sealingly covers a base part (3) of the housing, one of the cover (2) and base part (3) including an attaching element (17) for attaching the housing to the headlight.

2. Adjusting system as in claim 1 wherein a tip end portion of the hub (8) of the gear (9), which extends out of the bearing opening (13), has a portion of said rotation means thereat for allowing one to rotate the hub (8) with a tool thereat.

3. Adjusting system as in claim 1 wherein the openings (14) for the rod-shaped auxiliary tool (11) extends radially to the length axis of the adjusting pin.

4. Adjusting system as in claim 3 wherein the hollow cylinder (10) has a water drain opening (23) between openings (14).

5. Adjusting system as in claim 1 wherein the end wall (12) of the hollow cylinder (10) has a plurality of slits (19) extending radially outwardly from its centrally-positioned bearing opening (13) which divide the end wall (12) into end wall portions (20) which provide axial spring action, and whose edges adjacent the centrally bearing opening (13), self-lockingly engage in the ring groove (21) of the hub (8).

6. Adjusting system as in claim 1 wherein the end wall (12) of the hollow cylinder (10) has a substantially conical shape with a length axis of the conical shape coinciding with the length axis of the adjusting pin (4) and the cone extending outwardly from the hollow cylinder (10).

7. Adjusting system as in claim 1 wherein guiding jackets (22) on the outer surface of the hollow cylinder (10) surround the openings (14) in the hollow cylinder (10).

8. Adjusting system as in claim 1 wherein the outer surface of the hub (8) of the gear (9) forms an engagement stop surface for a tip of the rod-shaped auxiliary tool (11) between the end wall (12) of the hollow cylinder (10) and the gear (9) when the tooth-like protrusions of the rod-shaped auxiliary tool mesh with the teeth of the gear (9).

9. Adjusting system as in claim 1 wherein the hub (8) of the gear (9) is manufactured as one piece of resinous plastic material and wherein an outer surface of the gear (9) has a surrounding ring groove which serves for receiving a ring seal (27).

10. Adjusting system as in claim 1 wherein at least one shoulder (24) is formed on an inner side of the cover (2) to extend into the housing, is arranged close to a wall of an outwardly extending plug housing (26) of the cover (2), and secures an electrical motor (25) of the electromotor adjusting apparatus between it and a surface of the base part (3).

* * * * *